(12) United States Patent
Dinh et al.

(10) Patent No.: US 11,244,466 B2
(45) Date of Patent: Feb. 8, 2022

(54) AUTOMATED CAPACITY MANAGEMENT USING ARTIFICIAL INTELLIGENCE TECHNIQUES

(71) Applicant: Dell Products L.P., Round Rock, TX (US)

(72) Inventors: Hung T. Dinh, Austin, TX (US); Bijan K. Mohanty, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 157 days.

(21) Appl. No.: 16/802,846

(22) Filed: Feb. 27, 2020

(65) Prior Publication Data
US 2021/0272308 A1 Sep. 2, 2021

(51) Int. Cl.
| | | |
|---|---|---|
| *G06T 7/62* | (2017.01) | |
| *G06N 3/04* | (2006.01) | |
| *G06T 7/11* | (2017.01) | |
| *G06T 11/20* | (2006.01) | |

(52) U.S. Cl.
CPC ............ *G06T 7/62* (2017.01); *G06N 3/0454* (2013.01); *G06T 7/11* (2017.01); *G06T 11/20* (2013.01); *G06T 2207/20081* (2013.01); *G06T 2207/20084* (2013.01); *G06T 2210/12* (2013.01)

(58) Field of Classification Search
CPC ... G06T 7/62; G06T 7/11; G06T 11/20; G06T 2207/20081; G06T 2207/20084; G06T 2210/12; G06N 3/0454
See application file for complete search history.

(56) References Cited

U.S. PATENT DOCUMENTS

| | | | | |
|---|---|---|---|---|
| 8,078,330 | B2 * | 12/2011 | Brickfield | H02J 3/008 |
| | | | | 700/291 |
| 9,595,070 | B2 * | 3/2017 | Matsuoka | F24F 11/00 |
| 9,810,441 | B2 * | 11/2017 | Dean-Hendricks | F24F 11/30 |
| 9,810,442 | B2 * | 11/2017 | Matsuoka | G05D 23/1904 |
| 10,521,098 | B2 * | 12/2019 | Hay | G06T 7/248 |
| 10,699,418 | B1 * | 6/2020 | Miller | G06T 7/246 |
| 10,789,796 | B1 * | 9/2020 | Munir | G07C 9/00 |

(Continued)

OTHER PUBLICATIONS

He et al., Mask R-CNN, arXiv:1703.06870, Jan. 24, 2018.

*Primary Examiner* — Mia M Thomas
(74) *Attorney, Agent, or Firm* — Ryan, Mason & Lewis, LLP (57) ABSTRACT

Methods, apparatus, and processor-readable storage media for automated capacity management using artificial intelligence techniques are provided herein. An example computer-implemented method includes obtaining image data pertaining to occupancy of a confined space; determining a level of occupancy in the confined space and one or more types of entities occupying the confined space by processing the image data using a first set of one or more artificial intelligence techniques comprising at least a first machine learning model; automatically determining one or more capacity management parameters with respect to the confined space by analyzing the determined level of occupancy and the one or more determined types of entities using a second set of one or more artificial intelligence techniques comprising at least a second machine learning model; and performing one or more automated actions based at least in part on the one or more determined capacity management parameters.

20 Claims, 9 Drawing Sheets

(56) References Cited

U.S. PATENT DOCUMENTS

| | | | |
|---|---|---|---|
| 10,997,325 B2* | 5/2021 | Austern | G06F 30/20 |
| 11,106,842 B2* | 8/2021 | Segev | G06K 9/2081 |
| 2014/0277761 A1* | 9/2014 | Matsuoka | F24F 11/30 |
| | | | 700/276 |
| 2014/0277769 A1* | 9/2014 | Matsuoka | G05B 13/0265 |
| | | | 700/278 |
| 2015/0094876 A1* | 4/2015 | Baldwin | B60R 5/00 |
| | | | 701/1 |
| 2016/0096270 A1* | 4/2016 | Ibarz Gabardos | B25J 9/161 |
| | | | 700/253 |
| 2016/0375592 A1* | 12/2016 | Szatmary | B25J 9/1676 |
| | | | 700/255 |
| 2019/0162856 A1* | 5/2019 | Atalla | G01S 17/931 |
| 2020/0051193 A1* | 2/2020 | Miao | G06Q 10/06 |
| 2020/0382929 A1* | 12/2020 | Shi | G06N 3/063 |
| 2020/0394708 A1* | 12/2020 | Cella | G06Q 40/025 |
| 2020/0401815 A1* | 12/2020 | Miller | G06N 20/00 |
| 2020/0410236 A1* | 12/2020 | Miller | G06K 9/00778 |
| 2020/0410658 A1* | 12/2020 | Miller | G06K 9/6271 |
| 2021/0110700 A1* | 4/2021 | Harman | H04N 7/183 |
| 2021/0158097 A1* | 5/2021 | Armstrong | G06N 3/08 |

* cited by examiner

FIG. 1

```
import os
import sys
import random
import math
import numpy as np
import skimage.io
import matplotlib
import matplotlib.pyplot as plt

# Root directory of the project
ROOT_DIR = os.path.abspath("../")

import warnings
warnings.filterwarnings("ignore")

# Import Mask RCNN
sys.path.append(ROOT_DIR)  # To find local version of the library
from mrcnn import utils
import mrcnn.model as modellib
from mrcnn import visualize
# Import COCO config
sys.path.append(os.path.join(ROOT_DIR, "samples/coco/"))  # To find local version
import coco %matplotlib inline
Directory to save logs and trained model
MODEL_DIR = os.path.join(ROOT_DIR, "logs")
```

FIG. 2A

```
# Local path to trained weights file
COCO_MODEL_PATH = os.path.join('', "mask_rcnn_coco.h5")

# Download COCO trained weights from Releases if needed
if not os.path.exists(COCO_MODEL_PATH):
    utils.download_trained_weights(COCO_MODEL_PATH)

# Directory of images to run detection on
IMAGE_DIR = os.path.join(ROOT_DIR, "images")

class InferenceConfig(coco.CocoConfig):
    # Set batch size to 1 since we'll be running inference on
    # one image at a time. Batch size = GPU_COUNT * IMAGES_PER_GPU
    GPU_COUNT = 1
    IMAGES_PER_GPU = 1 config = InferenceConfig()
config.display()

# Create model object in inference mode.
model = modellib.MaskRCNN(mode="inference", model_dir='mask_rcnn_coco.hy', config=config)

# Load weights trained on MS-COCO
model.load_weights('mask_rcnn_coco.h5', by_name=True)
```

FIG. 2B

```
# COCO Class names
class_names = ['BG', 'person', 'bicycle', 'car', 'motorcycle', 'airplane',
    'bus', 'train', 'truck', 'boat', 'traffic light',
    'fire hydrant', 'stop sign', 'parking meter', 'bench', 'bird',
    'cat', 'dog', 'horse', 'sheep', 'cow', 'elephant', 'bear',
    'zebra', 'giraffe', 'backpack', 'umbrella', 'handbag', 'tie',
    'suitcase', 'frisbee', 'skis', 'snowboard', 'sports ball',
    'kite', 'baseball bat', 'baseball glove', 'skateboard',
    'surfboard', 'tennis racket', 'bottle', 'wine glass', 'cup',
    'fork', 'knife', 'spoon', 'bowl', 'banana', 'apple',
    'sandwich', 'orange', 'broccoli', 'carrot', 'hot dog', 'pizza',
    'donut', 'cake', 'chair', 'couch', 'potted plant', 'bed',
    'dining table', 'toilet', 'tv', 'laptop', 'mouse', 'remote',
    'keyboard', 'cell phone', 'microwave', 'oven', 'toaster',
    'sink', 'refrigerator', 'book', 'clock', 'vase', 'scissors',
    'teddy bear', 'hair drier', 'toothbrush']

# Load an image from the images folder
image = skimage.io.imread('sample.jpg')

# original image
plt.figure(figsize=(12,10))
skimage.io.imshow(image)

# Run detection
results = model.detect([image], verbose=1)

# Visualize results
r = results[0]
visualize.display_instances(image, r['rois'], r['masks'], r['class_ids'], class_names, r['scores'])
```

FIG. 3

```
import numpy as np
import pandas as pd
from sklearn.model_selection import train_test_split
from sklearn.ensemble import RandomForestClassifier
from sklearn.metrics import accuracy_score
from sklearn.metrics import confusion_matrix
from sklearn.tree import DecisionTreeClassifier
from sklearn import tree import warnings filter
from warnings import simplefilter
# ignore all future warnings
simplefilter(action='ignore', category=FutureWarning)

capacity_data = pd.read_csv("data/capacityData.csv",sep=',', header= None)

print (capacity_data)

print ("Dataset Length:: ", len(capacity_data))
print ("Dataset Shape:: ", capacity_data.shape)

clean_capacity_data = capacity_data[capacity_data[6] != '?']
print(clean_capacity_data)
```

FIG. 4

```
X = clean_capacity_data.values[:, 1:11]
Y = clean_capacity_data.values[:,0]

X_train, X_test, y_train, y_test = train_test_split( X, Y, test_size = 0.3, random_state = 100)

print(X_train)
print(X_train.shape)
print(X_test.shape)
print(y_train.shape)
print(y_test.shape)

y_train = y_train.astype('int')
y_test = y_test.astype('int')

print(y_train)

trained_model = RandomForestClassifier()
trained_model.fit(X_train, y_train)

print(trained_model)

predictions = trained_model.predict(X_test)

# Train and Test Accuracy
print("Train Accuracy :: ", accuracy_score(y_train, trained_model.predict(X_train)))
print("Test Accuracy  :: ", accuracy_score(y_test, predictions))
print("Confusion matrix ", confusion_matrix(y_test, predictions))
```

AUTOMATED CAPACITY MANAGEMENT USING ARTIFICIAL INTELLIGENCE TECHNIQUES

FIELD

The field relates generally to information processing systems, and more particularly to techniques for data analysis using such systems.

BACKGROUND

Capacity-based systems often operate in a similar manner regardless of whether or not they are at or near maximum capacity. For example, an elevator will commonly continue to stop at floors for potential pick-ups even if the elevator is fully or near-fully occupied with people and/or objects. By way of further example, confined spaces such as theaters, auditoriums and stadiums commonly impose occupancy limits that are traditionally monitored manually based on head-counts of people entering and exiting the spaces. Also, although such spaces typically have thermostats or other temperature control systems, such arrangements do not adequately adjust for occupancy of the spaces. Accordingly, conventional capacity management techniques fail to dynamically calculate occupancy in confined spaces and take reactive and/or proactive actions based thereon.

SUMMARY

Illustrative embodiments of the disclosure provide automated capacity management using artificial intelligence (AI) techniques. An exemplary computer-implemented method includes obtaining image data pertaining to occupancy of a confined space, and determining a level of occupancy in the confined space and one or more types of entities occupying the confined space by processing the image data using a first set of one or more artificial intelligence techniques comprising at least a first machine learning model. The method also includes automatically determining one or more capacity management parameters with respect to the confined space by analyzing the determined level of occupancy and the one or more determined types of entities using a second set of one or more artificial intelligence techniques comprising at least a second machine learning model, and performing one or more automated actions based at least in part on the one or more determined capacity management parameters.

Illustrative embodiments can provide significant advantages relative to conventional capacity management techniques. For example, challenges associated with dynamically calculating occupancy in confined spaces are overcome in one or more embodiments through applying multiple artificial intelligence techniques to dynamic image data to predict occupancy amounts and types within a confined space.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
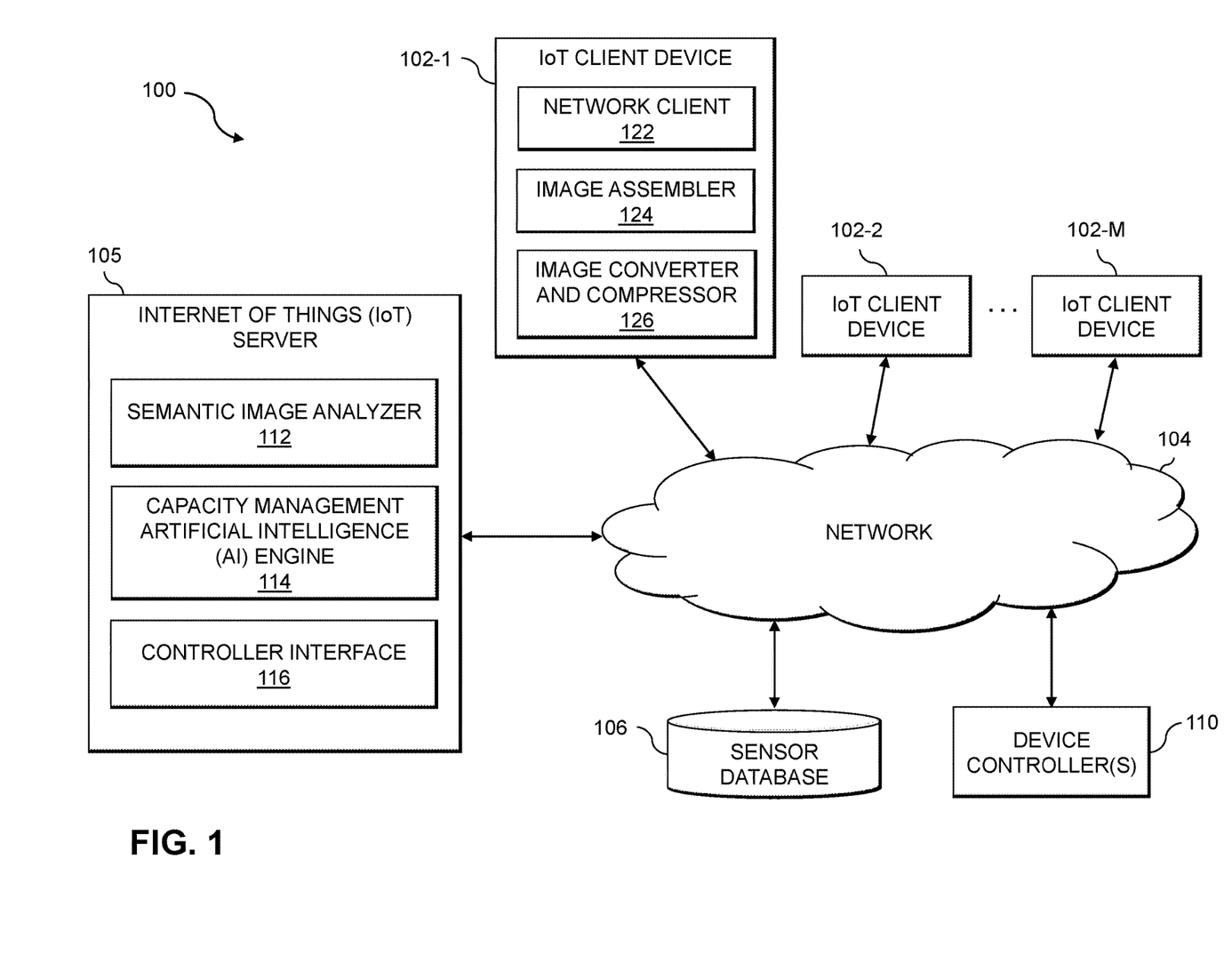
FIG. 1 shows an information processing system configured for automated capacity management using AI techniques in an illustrative embodiment.

FIG. 1 shows a computer network (also referred to herein as an information processing system) 100 configured in accordance with an illustrative embodiment. The computer network 100 comprises a plurality of IoT client devices 102-1, 102-2, . . . 102-M, collectively referred to herein as IoT client devices 102. The IoT client devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is IoT server 105, as well as device controller(s) 110. It is to be appreciated that, although shown separate from IoT client devices 102, device controller(s) 110 can be resident on and/or part of one or more IoT client devices 102, and/or can be separate IoT devices themselves. By way merely of example, such device controller(s) 110 can include elevator remote management controller(s), datacenter heating, ventilating and air conditioning (HVAC) controller(s), theater inflow controller(s), etc.

The IoT client devices 102 may comprise, for example, cameras and/or sensors (e.g., three-dimensional (3D) depth sensor cameras), as well as devices such as mobile telephones, laptop computers, tablet computers, desktop computers or other types of computing devices. Such devices are examples of what are more generally referred to herein as "processing devices." Some of these processing devices are also generally referred to herein as "computers."

The IoT client devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The IoT client devices 102 (as evidence in FIG. 1 by exemplary IoT client device 102-1) further comprises a network client 122, an image assembler 124, and an image converter and compressor 126. The network client 122 can include networking capabilities such as ethernet, Wi-Fi, etc. The image assembler 124, as further detailed herein, can include one or more computer vision libraries. Also, the image converter and compressor 126 can process image data captured by the IoT client device 102 and generate a compressed image in pixel form.

It is to be appreciated that this particular arrangement of modules 122, 124 and 126 illustrated in IoT client devices 102 of the FIG. 1 embodiment is presented by way of example only, and alternative arrangements can be used in other embodiments. For example, the functionality associated with modules 122, 124 and 126 in other embodiments can be combined into a single module, or separated across a larger number of modules. As another example, multiple distinct processors can be used to implement different ones of modules 122, 124 and 126 or portions thereof. At least portions of modules 122, 124 and 126 may be implemented at least in part in the form of software that is stored in memory and executed by a processor.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the IoT server 105 can have an associated database 106 configured to store sensor data pertaining to occupancy information, image information, relevant historical data, etc.

The database 106 in the present embodiment is implemented using one or more storage systems associated with the IoT server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the IoT server 105 can be one or more input-output devices, which illustratively comprise keyboards, displays or other types of input-output devices in any combination. Such input-output devices can be used, for example, to support one or more user interfaces to the IoT server 105, as well as to support communication between the IoT server 105 and other related systems and devices not explicitly shown.

The IoT client devices 102 and the IoT server 105 in the FIG. 1 embodiment are assumed to be implemented using at least one processing device. Each such processing device generally comprises at least one processor and an associated memory, and implements one or more functional modules for controlling certain features of the IoT server 105.

More particularly, IoT client devices 102 and IoT server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the IoT client devices 102 and/or the IoT server 105 to communicate over the network 104 with each other (as well as one or more other networked devices), and illustratively comprises one or more conventional transceivers.

As also depicted in FIG. 1, the IoT server 105 further comprises a semantic image analyzer 112, a capacity management AI engine 114, and a controller interface 116.

It is to be appreciated that this particular arrangement of modules 112, 114 and 116 illustrated in the IoT server 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automated capacity management using AI techniques involving IoT client devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example IoT server 105 in computer network 100 will be described in more detail with reference to the flow diagram of FIG. 6.

Accordingly, at least one embodiment includes automated capacity management using AI techniques. Such an embodiment includes implementing an intelligent IoT-based capacity management system using 3D depth sensor cameras and semantic image segmentation (e.g., instance-based segmentation) with AI and/or machine learning techniques. Using such 3D depth sensor cameras enables the identification of certain objects (e.g., people) from other objects (e.g., cargo or furniture) and related calculations of the numbers and sizes of such identified objects. As further detailed herein, such an embodiment includes using smart logic and/or rules and machine learning models to optimize operations in various contexts such as, for example, introducing data center operational efficiency, modifying elevator stops, generating room capacity alerts and controlling energy utilization (e.g., with respect to heating and/or air conditioning).

One or more embodiments include utilizing multiple distinct machine learning models in conjunction with multiple hardware and/or software components across an IoT framework. In connection with certain confined spaces, such an embodiment includes using a matrix of cameras (e.g., IoT client devices 102 in FIG. 1) and implementing a framework with computer vision (CV) libraries to collate segmented images from different cameras for a final image analysis. Subsequently, an IoT server (such as IoT server 105 in FIG. 1) can implement 3D deep learning techniques including, for example, one or more neural networks (such as an enhanced mask R-CNN), to analyze the assembled image(s) for object detection and instance segmentation, the output(s) of which can then be fed into a machine learning model to predict one or more occupancy-related variables. Such predicted occupancy-related variables can be utilized as a basis for one or more automated actions such as, for example, availability determinations, inflow analyses, making decisions for starting and/or stopping a system or device (e.g., an elevator), allowing and/or denying entry of individuals into the space, controlling energy utilization in the space (e.g., an auditorium or a datacenter), etc.

The machine learning model used to generate such predictions can include, for example, at least one ensemble-based random forest model, which can be implemented to determine one or more classifications. The specific model can be chosen, for example, based at least in part on the dimensionality and complexity of the data attributes in question. Further, in at least one embodiment, historical data is utilized to train such models for accuracy.

As noted above, one or more embodiments include using 3D semantic instance segmentation in conjunction with an enhanced mask R-CNN. Such an embodiment can include performing 3D deep image analysis and dense prediction at the voxel (also referred to as a 3D pixel) level. Accordingly, one or more voxels in an image can be linked to a class label such as "person," "table," "laptop," etc., which facilitates understanding of the type, location, and shape and/or size of each object identified in the processed image data. Additionally, implementing semantic instance segmentation enables identification of one or more objects in the processed image data as well as determination of the quantity and/or number of the same type of object (for example, people) in the processed image data.

As also detailed herein, one or more embodiments include utilizing an enhanced mask R-CNN, which can include a two stage framework: a first stage that involves scanning image data using a backbone (e.g., a feature pyramid network which is an extension of the CNN) and generating one or more proposals (e.g., one or more areas likely to contain a particular object); and a second stage that predicts the class of one or more objects in the image data, and generates one or more bounding boxes and one or more masks at the pixel level based at least in part on the one or more proposals generated in the first stage.

At least one embodiment includes processing 3D images in the same mask R-CNN model with two separate pipelines for 3D detection and 3D masking for prediction at the voxel level. Additionally or alternatively, 3D geometry and color can be fed into a 3D backbone (e.g., as noted above, a feature pyramid network which is an extension of the CNN) to propose the one or more object bounding boxes and respective class types using a 3D region proposal network (RPN) and a 3D region of interest (ROI) layer. In such an embodiment, the Mask backbone uses color and one or more geometry features, in addition to the 3D detection results, to predict per-voxel instance masks inside at least one of the 3D bounding boxes.

Figure 2A:
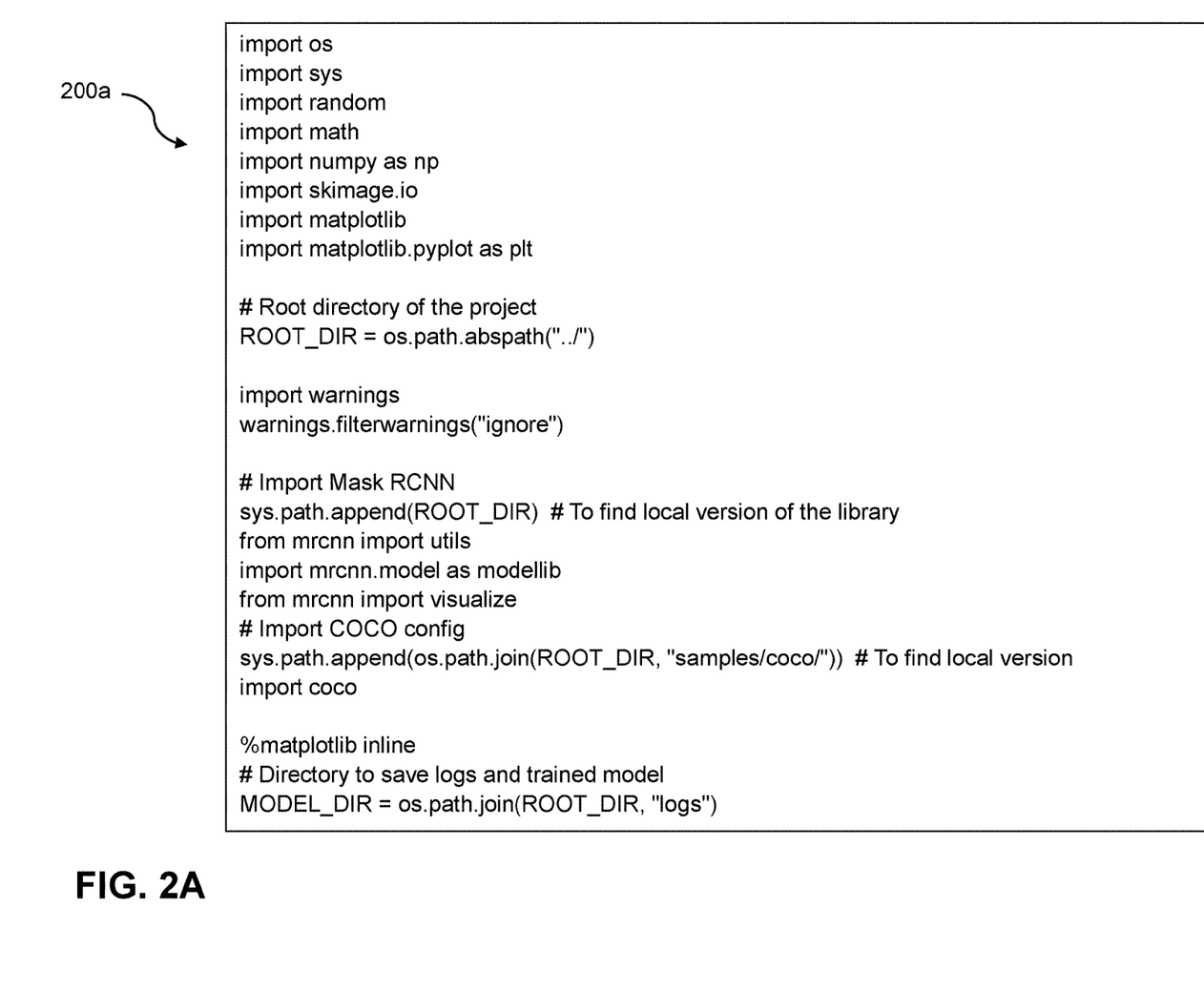
FIG. 2A and FIG. 2B show example code snippets for implementing a mask regional-convolutional neural network (R-CNN) with sample training data in an illustrative embodiment.
Figure 2B:
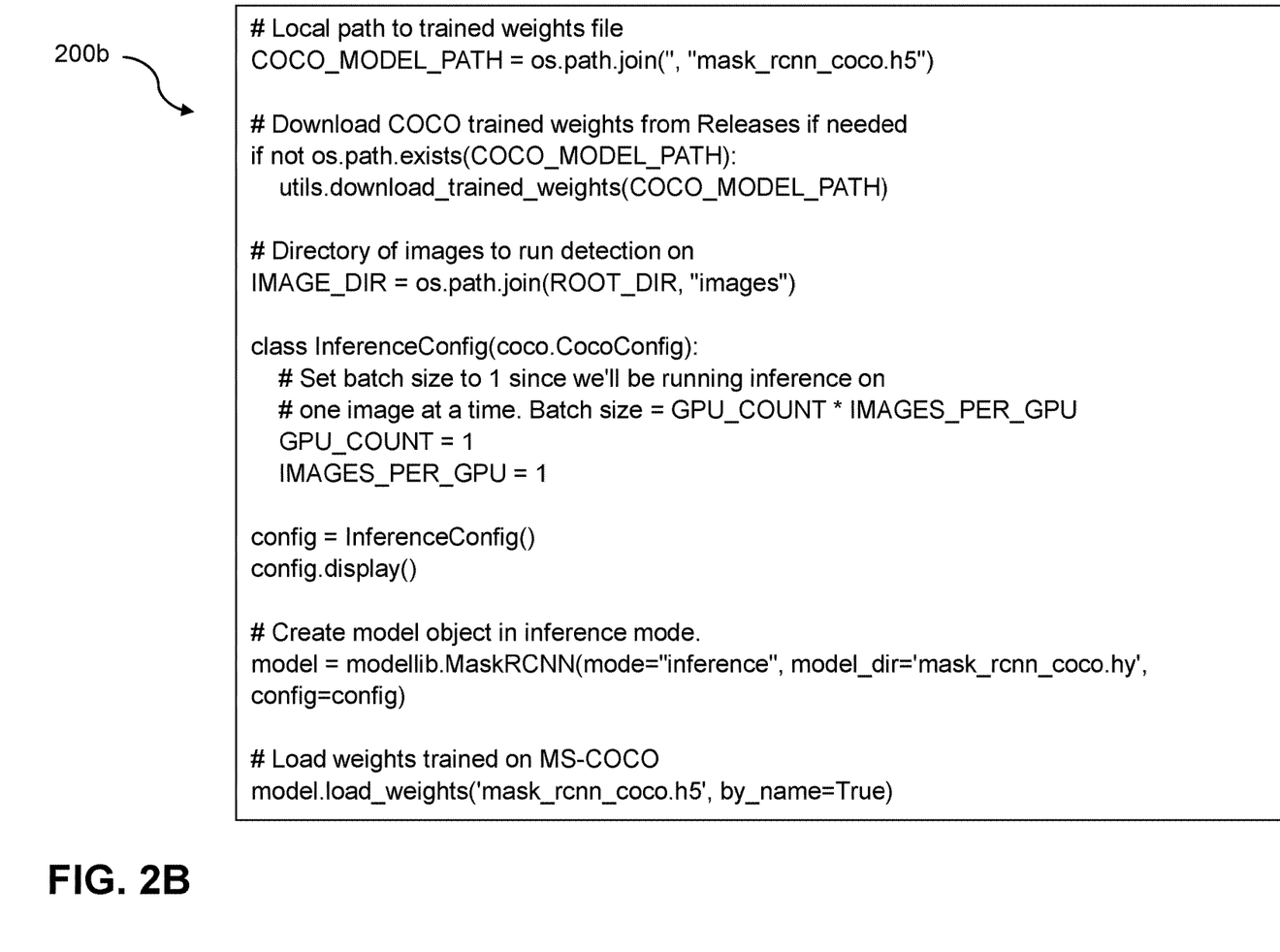
Figure 3:
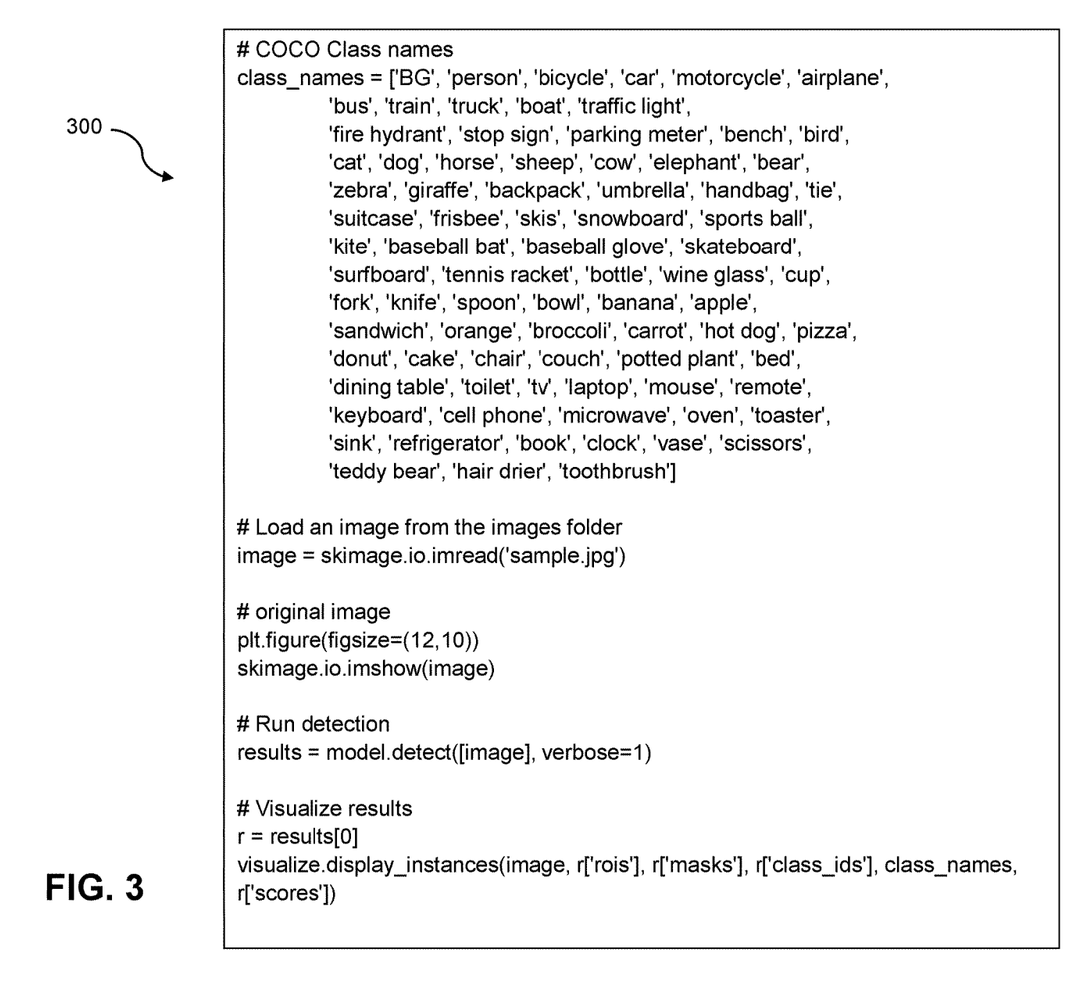
FIG. 3 shows example code snippets for implementing a mask R-CNN with sample training data in an illustrative embodiment.

As detailed below, FIG. 2 and FIG. 3 depict example code snippets which use Python and Scikit-learn libraries to implement a mask R-CNN model for image segmentation to calculate the occupancy and/or capacity of a confined space. Additionally, in connection with such example code snippets, a Jupyter Notebook can be used as the integrated development environment (IDE) to develop and test the code, and NumPy can be used for multi-dimensional container manipulation.

FIG. 2A and FIG. 2B show example code snippets for implementing a mask R-CNN with sample training data in an illustrative embodiment. In this embodiment, code snippets 200a and 200b are executed by or under the control of a processing device, such as IoT server 105 of the FIG. 1 embodiment, or another type of processing device or platform.

The code snippets 200a and 200b illustrate the importing of libraries (skimage, NumPy, etc.) along with the path for pre-trained weights and images on which segmentation is to be performed (i.e., COCO_MODEL_PATH=os.path.join(", "mask_rcnn_coco.h5")). Once the model is created (model=modellib.MaskRCNN(mode="inference", model_dir='mask_rcnn_coco.hy', config=config)), the model will be loaded with the pre-trained weights.

It is to be appreciated that this particular set of code snippets shows just one example implementation of a mask R-CNN, and alternative implementations of the process can be used in other embodiments.

FIG. 3 shows example code snippets for implementing a mask R-CNN with sample training data in an illustrative embodiment. In this embodiment, code snippets 300 are executed by or under the control of a processing device, such as IoT server 105 of the FIG. 1 embodiment, or another type of processing device or platform.

The code snippets 300 illustrate a sample image passed to the model for detection and prediction (results=model.detect ([image], verbose=1). This model provides the image segmentation (the type of image and the number of items in the image). Once the objects (e.g., people, items, etc.) in the image are identified and the number of the objects is calculated, such information can be passed through a random forest classifier to predict if one or more capacity parameters have been met (e.g., reached a maximum limit) or not.

It is to be appreciated that this particular set of code snippets shows just one example implementation of a mask R-CNN, and alternative implementations of the process can be used in other embodiments.

Figure 4:
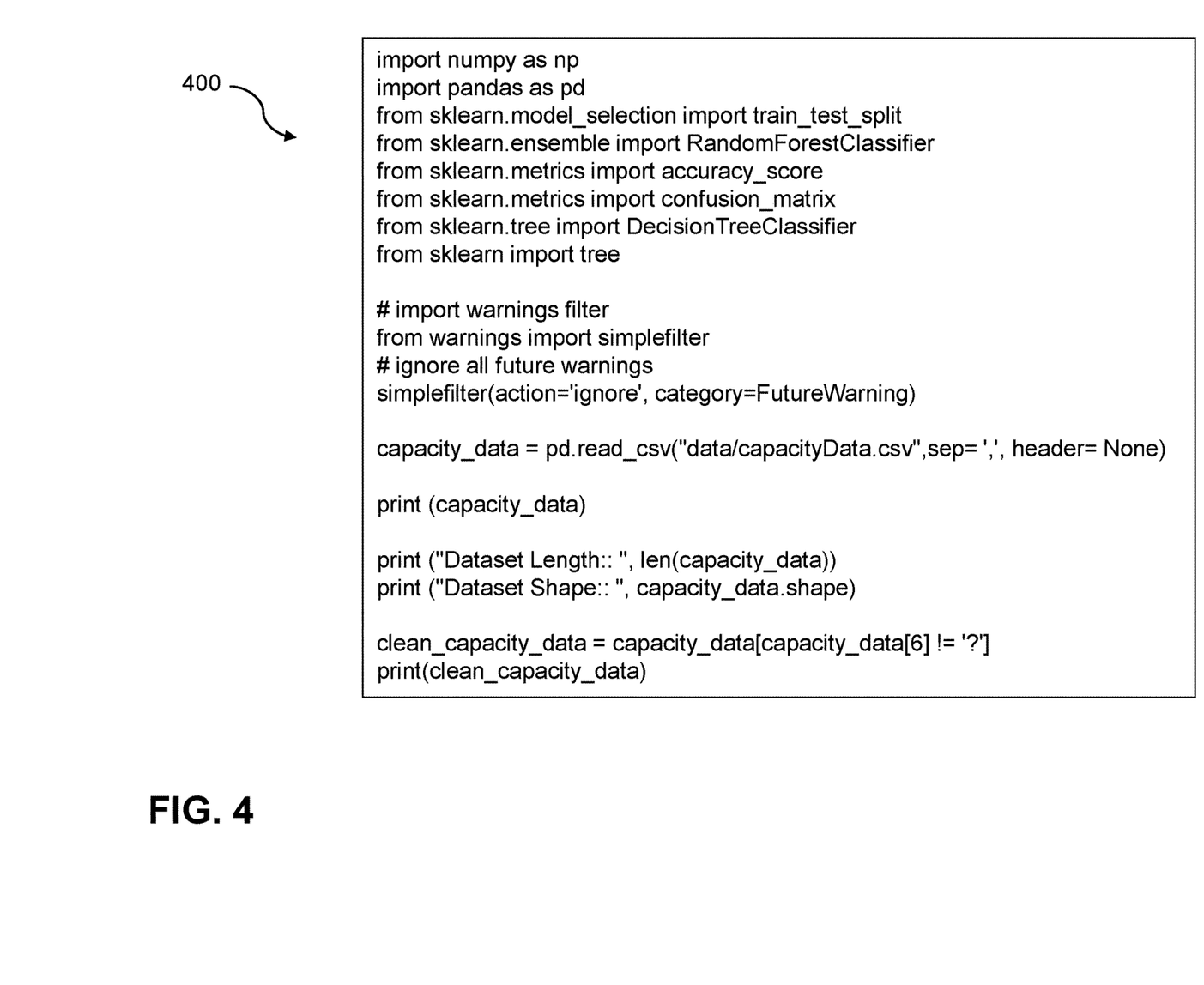
FIG. 4 shows example code snippets for implementing a random forest model using sample data in an illustrative embodiment.

FIG. 4 shows example code snippets for implementing a random forest model using sample data in an illustrative embodiment. In this embodiment, code snippets 400 are executed by or under the control of a processing device, such as IoT server 105 of the FIG. 1 embodiment, or another type of processing device or platform.

The code snippets 400 illustrate building a random forest model using Python, Scikit-learn, pandas and NumPy libraries, and also training the model using a set of historical capacity and/or occupancy data. The model is then used to predict the probability of reaching full capacity in a given space. In the example code snippet 400, the libraries are imported and the historical capacity and/or occupancy data are read (capacity_data=pd.read_csv("data/capacityData.csv",sep=header=None).

It is to be appreciated that this particular set of code snippets shows just one example implementation of a random forest model, and alternative implementations of the process can be used in other embodiments.

Figure 5:
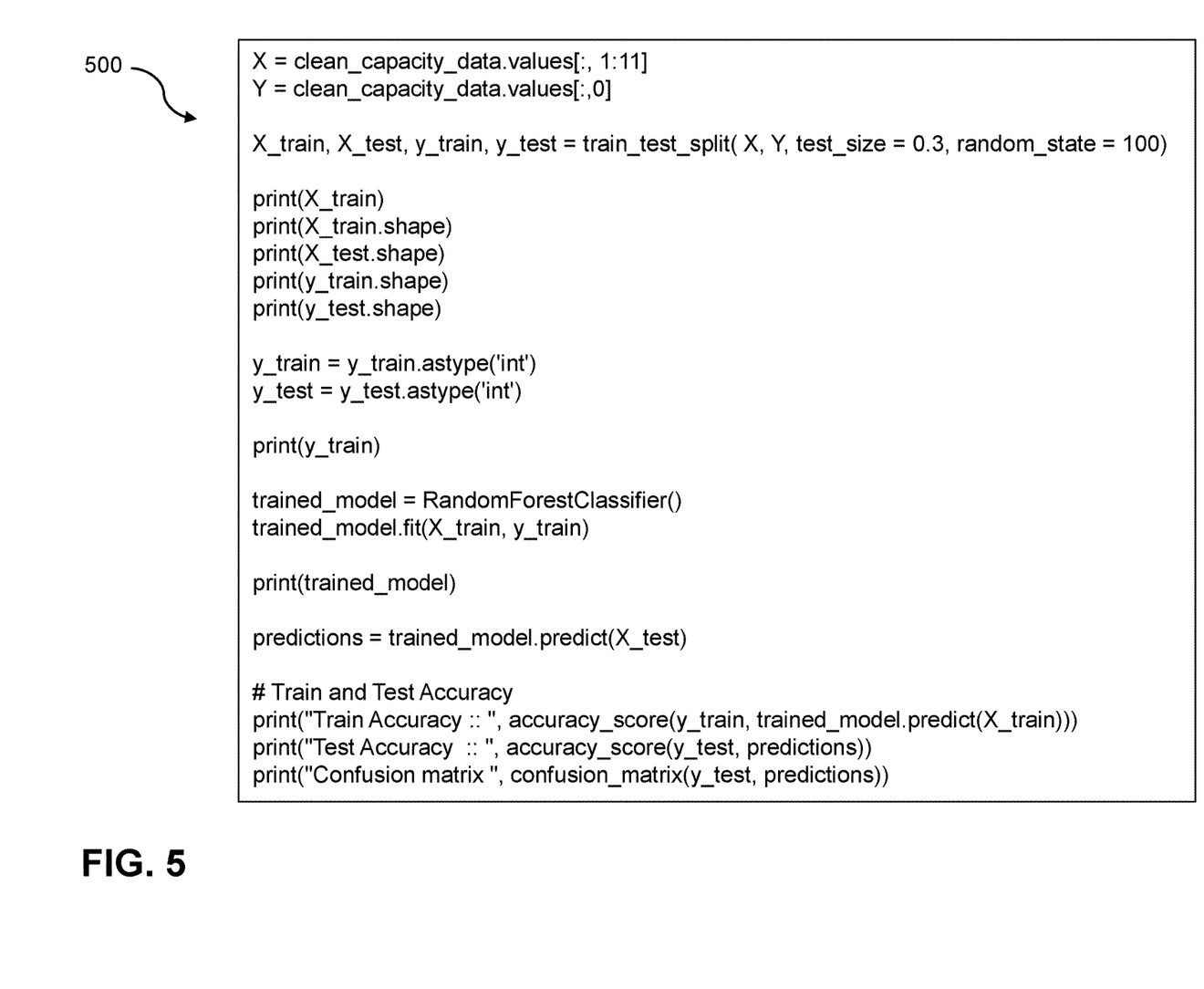
FIG. 5 shows example code snippets for implementing a random forest model using sample data in an illustrative embodiment.

FIG. 5 shows example code snippets for implementing a random forest model using sample data in an illustrative embodiment. In this embodiment, code snippets 500 are executed by or under the control of a processing device, such as IoT server 105 of the FIG. 1 embodiment, or another type of processing device or platform.

The code snippets 500 illustrate creating a random forest classifier model and training the random forest classifier model using training data:

(trained_model=RandomForestClassifier( )
trained_model.fit(X_train, y_train).

After training the classifier model, the classifier model is used to generate one or more predictions by passing test data pertaining to whether one or more capacity parameters have been met (e.g., reached a maximum limit) or not for a given space (predictions=trained_model.predict(X_test)).

It is to be appreciated that this particular set of code snippets shows just one example implementation of a random forest model, and alternative implementations of the process can be used in other embodiments.

Figure 6:
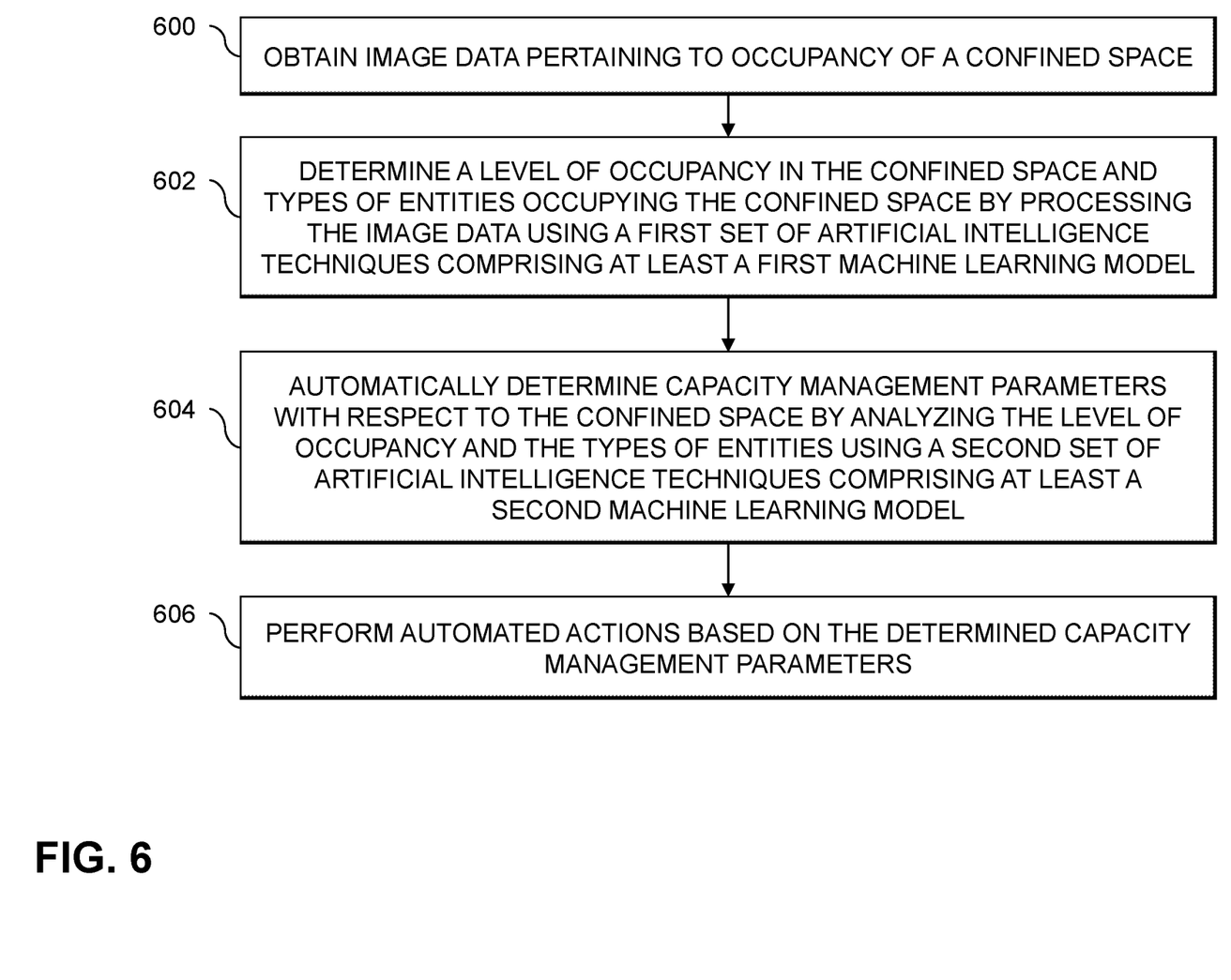
FIG. 6 is a flow diagram of a process for automated capacity management using AI techniques in an illustrative embodiment.

FIG. 6 is a flow diagram of a process for automated capacity management using artificial intelligence techniques in an illustrative embodiment. It is to be understood that this particular process is only an example, and additional or alternative processes can be carried out in other embodiments.

In this embodiment, the process includes steps 600 through 606. These steps are assumed to be performed by the IoT server 105 utilizing its modules 112, 114 and 116.

Step 600 includes obtaining image data pertaining to occupancy of a confined space.

Step 602 includes determining a level of occupancy in the confined space and one or more types of entities occupying the confined space by processing the image data using a first set of one or more artificial intelligence techniques comprising at least a first machine learning model. In at least one embodiment, processing the image data using the first set of one or more artificial intelligence techniques comprising at least the first machine learning model includes performing at least one object identification task and at least one instance segmentation task using a mask R-CNN. In such an embodiment, processing the image data using the mask R-CNN can include identifying one or more areas within the image data likely to contain one or more entities by scanning the image data using at least one feature pyramid network, generating one or more bounding boxes within the image data based at least in part on the one or more identified areas, and generating at least one mask at pixel-level within at least a portion of the one or more identified areas. Also, in such an embodiment, the at least one feature pyramid network can include information pertaining to three-dimensional geometry and information pertaining to one or more colors, and the image data can include three-dimensional image data, wherein using the mask R-CNN comprises linking one or more voxels in the three-dimensional image data to at least one class label.

Step 604 includes automatically determining one or more capacity management parameters with respect to the confined space by analyzing the determined level of occupancy and the one or more determined types of entities using a second set of one or more artificial intelligence techniques comprising at least a second machine learning model. In one or more embodiments, the second machine learning model includes at least one random forest model, and wherein analyzing the determined level of occupancy and the one or more determined types of entities using the at least one random forest model comprises performing one of more classifications across multiple capacity management parameters using multiple decision trees corresponding thereto. Also, in at least one embodiment, the one or more capacity management parameters can include at least one parameter pertaining to entity entry into the confined space and/or at least one parameter pertaining to energy utilization in the confined space.

Step 606 includes performing one or more automated actions based at least in part on the one or more determined capacity management parameters. In one or more embodiments, performing the one or more automated actions comprises automatically outputting instructions to at least one capacity management-related controller associated with the confined space. In such an embodiment, the at least one capacity management-related controller includes at least one IoT device which controls one or more variables within the confined space. Additionally or alternatively, in one or more embodiments, performing the one or more automated actions includes automatically notifying at least one user with the one or more determined capacity management parameters.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to apply multiple artificial intelligence techniques to dynamic image data to predict occupancy amounts and types within a confined space. These and other embodiments can effectively overcome challenges associated with dynamically calculating occupancy in confined spaces and taking reactive and/or proactive actions related thereto.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
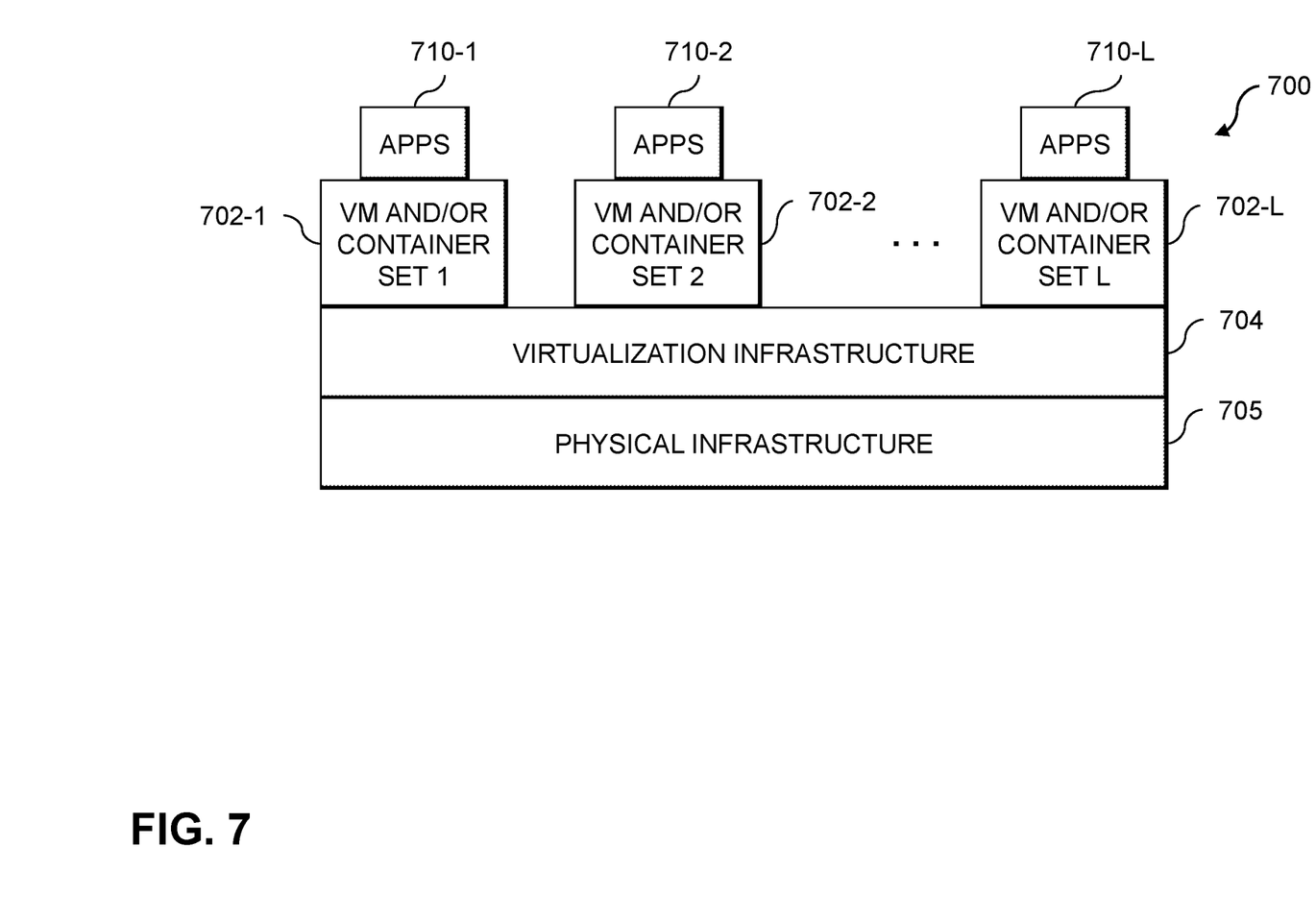
FIGS. 7 and 8 show examples of processing platforms that may be utilized to implement at least a portion of an information processing system in illustrative embodiments.
Figure 8:
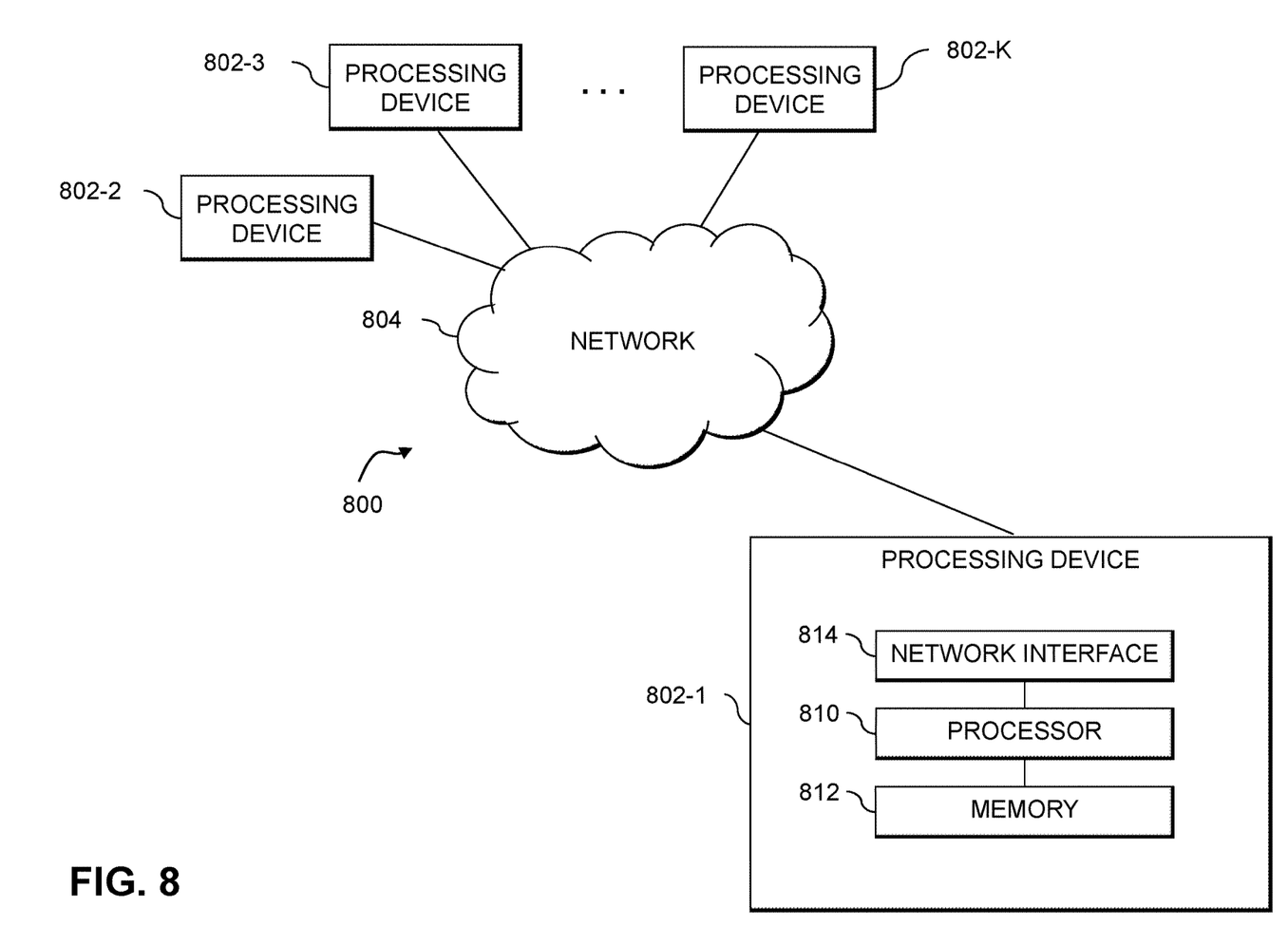

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining image data pertaining to occupancy of a confined space;
    determining a level of occupancy in the confined space and one or more types of entities occupying the confined space by processing the image data using a first set of one or more artificial intelligence techniques comprising at least a first machine learning model, wherein processing the image data using the first set of one or more artificial intelligence techniques comprising at least the first machine learning model comprises performing at least one object identification task and at least one instance segmentation task using a mask regional-convolutional neural network (R-CNN);
    automatically determining one or more capacity management parameters with respect to the confined space by analyzing the determined level of occupancy and the one or more determined types of entities using a second set of one or more artificial intelligence techniques comprising at least a second machine learning model; and
    performing one or more automated actions based at least in part on the one or more determined capacity management parameters;
    wherein the method is performed by at least one processing device comprising a processor coupled to a memory.

2. The computer-implemented method of claim 1, wherein processing the image data using the mask R-CNN comprises:
    identifying one or more areas within the image data likely to contain one or more entities by scanning the image data using at least one feature pyramid network;
    generating one or more bounding boxes within the image data based at least in part on the one or more identified areas; and
    generating at least one mask at pixel-level within at least a portion of the one or more identified areas.

3. The computer-implemented method of claim 2, wherein the at least one feature pyramid network comprises information pertaining to three-dimensional geometry and information pertaining to one or more colors.

4. The computer-implemented method of claim 2, wherein the image data comprise three-dimensional image data, and wherein using the mask R-CNN comprises linking one or more voxels in the three-dimensional image data to at least one class label.

5. The computer-implemented method of claim 1, wherein the second machine learning model comprises at least one random forest model, and wherein analyzing the determined level of occupancy and the one or more determined types of entities using the at least one random forest model comprises performing one of more classifications across multiple capacity management parameters using multiple decision trees corresponding thereto.

6. The computer-implemented method of claim 1, wherein the one or more capacity management parameters comprises at least one parameter pertaining to entity entry into the confined space.

7. The computer-implemented method of claim 1, wherein the one or more capacity management parameters comprises at least one parameter pertaining to energy utilization in the confined space.

8. The computer-implemented method of claim 1, wherein performing the one or more automated actions comprises automatically outputting instructions to at least one capacity management-related controller associated with the confined space.

9. The computer-implemented method of claim 8, wherein the at least one capacity management-related controller comprises at least one Internet of Things device which controls one or more variables within the confined space.

10. The computer-implemented method of claim 1, wherein performing the one or more automated actions comprises automatically notifying at least one user with the one or more determined capacity management parameters.

11. A non-transitory processor-readable storage medium having stored therein program code of one or more software programs, wherein the program code when executed by at least one processing device causes the at least one processing device:

to obtain image data pertaining to occupancy of a confined space;
to determine a level of occupancy in the confined space and one or more types of entities occupying the confined space by processing the image data using a first set of one or more artificial intelligence techniques comprising at least a first machine learning model, wherein processing the image data using the first set of one or more artificial intelligence techniques comprising at least the first machine learning model comprises performing at least one object identification task and at least one instance segmentation task using a mask R-CNN;
to automatically determine one or more capacity management parameters with respect to the confined space by analyzing the determined level of occupancy and the one or more determined types of entities using a second set of one or more artificial intelligence techniques comprising at least a second machine learning model; and
to perform one or more automated actions based at least in part on the one or more determined capacity management parameters.

12. The non-transitory processor-readable storage medium of claim 11, wherein processing the image data using the mask R-CNN comprises:

identifying one or more areas within the image data likely to contain one or more entities by scanning the image data using at least one feature pyramid network;
generating one or more bounding boxes within the image data based at least in part on the one or more identified areas; and
generating at least one mask at pixel-level within at least a portion of the one or more identified areas.

13. The non-transitory processor-readable storage medium of claim 12, wherein the at least one feature pyramid network comprises information pertaining to three-dimensional geometry and information pertaining to one or more colors.

14. The non-transitory processor-readable storage medium of claim 11, wherein the second machine learning model comprises at least one random forest model, and wherein analyzing the determined level of occupancy and the one or more determined types of entities using the at least one random forest model comprises performing one of more classifications across multiple capacity management parameters using multiple decision trees corresponding thereto.

15. An apparatus comprising:

at least one processing device comprising a processor coupled to a memory;
the at least one processing device being configured:
to obtain image data pertaining to occupancy of a confined space;
to determine a level of occupancy in the confined space and one or more types of entities occupying the confined space by processing the image data using a first set of one or more artificial intelligence techniques comprising at least a first machine learning model, wherein processing the image data using the first set of one or more artificial intelligence techniques comprising at least the first machine learning model comprises performing at least one object identification task and at least one instance segmentation task using a mask R-CNN;
to automatically determine one or more capacity management parameters with respect to the confined space by analyzing the determined level of occupancy and the one or more determined types of entities using a second set of one or more artificial intelligence techniques comprising at least a second machine learning model; and
to perform one or more automated actions based at least in part on the one or more determined capacity management parameters.

16. The apparatus of claim 15, wherein processing the image data using the mask R-CNN comprises:

identifying one or more areas within the image data likely to contain one or more entities by scanning the image data using at least one feature pyramid network;
generating one or more bounding boxes within the image data based at least in part on the one or more identified areas; and
generating at least one mask at pixel-level within at least a portion of the one or more identified areas.

17. The apparatus of claim 15, wherein the second machine learning model comprises at least one random forest model, and wherein analyzing the determined level of occupancy and the one or more determined types of entities using the at least one random forest model comprises performing one of more classifications across multiple capacity management parameters using multiple decision trees corresponding thereto.

18. The apparatus of claim 15, wherein performing the one or more automated actions comprises automatically outputting instructions to at least one capacity management-related controller associated with the confined space.

19. The apparatus of claim 15, wherein the at least one capacity management-related controller comprises at least one Internet of Things device which controls one or more variables within the confined space.

20. The apparatus of claim 15, wherein performing the one or more automated actions comprises automatically notifying at least one user with the one or more determined capacity management parameters.

* * * * *

UNITED STATES PATENT AND TRADEMARK OFFICE
CERTIFICATE OF CORRECTION

| | |
|---|---|
| PATENT NO. | : 11,244,466 B2 |
| APPLICATION NO. | : 16/802846 |
| DATED | : February 8, 2022 |
| INVENTOR(S) | : Hung T. Dinh and Bijan K. Mohanty |

It is certified that error appears in the above-identified patent and that said Letters Patent is hereby corrected as shown below:

In the Claims

Claim 5, Column 12, Line 55, replace "performing one of more classifications" with -- performing one or more classifications --.

Claim 14, Column 13, Line 62 through Column 14, Line 1, replace "performing one of more classifications" with -- performing one or more classifications --.

Claim 17, Column 14, Line 47, replace "performing one of more classifications" with -- performing one or more classifications --.

Signed and Sealed this
Twenty-fifth Day of July, 2023

Katherine Kelly Vidal
*Director of the United States Patent and Trademark Office*